F. Raymond,
Grain Ventilator.
No. 106,961.      Patented Aug. 30. 1870.

Witnesses:
John F. Fennell
F. C. Brecht.

Inventor
Fitch Raymond
By his attorney
Newton Crawford

United States Patent Office.

FITCH RAYMOND, OF CLEVELAND, OHIO.

Letters Patent No. 106,961, dated August 30, 1870.

IMPROVEMENT IN GRAIN-BINS.

The Schedule referred to in these Letters Patent and making part of the same.

I, FITCH RAYMOND, of Cleveland, in the county of Cuyahoga, in the State of Ohio, have invented certain Improvements in Grain-Bins, of which the following is a specification.

The object of this invention is, first, to construct a grain-bin and attach ventilating-tubes thereto, in such manner as that all the dust, small grain, and chaff of the grain will, when the grain is drawn out of the bin at the bottom thereof, freely go out with the grain, and leave the bin and tube or shield clear of such accumulation; and, secondly, to construct and apply the ventilating-tubes to the bin in such manner as that the tubes will ventilate the grain and keep it cool by a free circulation of cool air supplied from below the bin, and admitted through an open aperture in the bottom of the bin into a perforated metal tube, which rises but a portion of the height or depth of the bin above the bottom, depending upon the spaces between the kernels of the grain and their connection with each other to give a free circulation of cool air to all parts of the grain in the bin, whatever depth there may be to the bin or grain, and without any means of forcing or impelling the air through such grain; and It consists in the construction and arrangement of the parts to produce the results above set forth.

Figure 1:
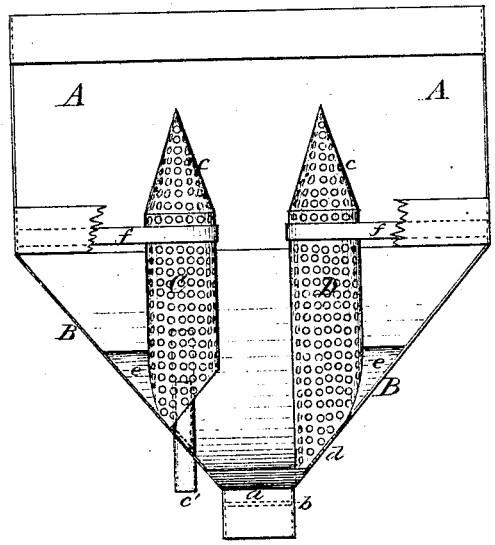
Figure 2:
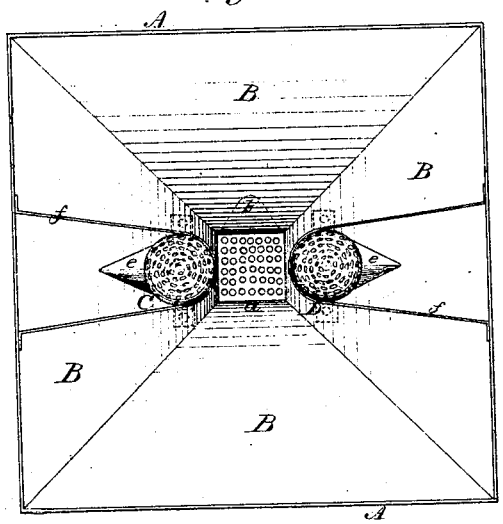

Figure 1 is a vertical section of the bin and devices, with the front side removed, and Figure 2 is a plan view of the same.

A represents the sides of a grain-bin, which may be of any desired shape or depth, and has the usual hopper-bottom B, so that the grain can be all drawn out of the bin through aperture $a$ at the bottom of the bin, by drawing the slide or gate $b$, as is commonly done in bins having hopper-bottoms.

C is a ventilating-tube or shield, made of perforated sheet-metal or of wire-cloth, as is most desirable, and rises two or more feet above the bottom of the bin, but to correspond with the depth of the bin, and will vary in diameter according to the number that may be used and the size of the bin in which they are placed; but, as a general rule, a bin twelve feet square will require four tubes or shields of about ten inches diameter, with the perforations of such size as will just prevent the smallest kernels of grain from passing through them.

This tube or shield has a conical top, $c$, also perforated, as is the tube, on its sides, and air is admitted through these perforations, and commingles with the air among the grain in the bin.

The tube or shield C is attached to the bottom of the bin by an angular bracket, $e$, which rises to a sharp angle on its top edge like the roof of a house, while the base where it joins the tube and bottom of the bin is of the same diameter as the tube. The inner side of the tube or shield, at its bottom end, is cut to an angle and left open, as seen in fig. 1.

There is a stay or brace, $f$, that holds the top of the tube in its upright position in the bin.

$c$ is an air-pipe passing through the inclined bottom of the bin, and extending a sufficient depth below the bin to allow a pipe to be attached, to force air into the shield C, if necessary, and up above the bottom centrally into tube or shield C far enough to prevent the grain that may go under the open space between the bottom of the bin and the inside of the lower end of the perforated shield from rising above the top thereof.

By this construction it is seen that no dust, dirt, chaff, or broken grain can lodge against the perforated tube or against the air-pipe $c'$, for the moment that the slide or gate $b$ is drawn the grain settles down, carrying with it the dust, dirt, and chaff, as the angular bracket or roof $e$ sheds off all the dirt as the grain is drawn out, by reason of the angle on the top of the roof $e$ being so sharp that neither dirt or chaff can adhere thereto, and thus preventing the accumulation of dust, dirt, and chaff against the pipe or tubes, and thereby be rid of the evil of affording a hatching place for the worms that are usually present where no such precaution exists.

It has heretofore been the practice to force air by some kind of power through the perforated tubes or shields into the grain, for the purpose of cooling or preventing the grain from becoming heated; but I have now ascertained that, if the grain is in a cool and dry state when placed in the bin, by a free circulation of the air through the mass of grain in the bin, no force is needed to supply the necessary supply of cool air to the grain, and that, by having an opening through the bottom of the bin a little less in diameter than the perforated tube, and allowing the air to flow freely through such opening into the short perforated tube or shield depending alone upon that supply of cool air taken from below the bin, and conducted into the short perforated tube or shield, and thence into the mass of grain, it is entirely sufficient to keep the grain cool and prevent its heating in the warmest weather of summer, for it is well known that, as the air from any cause becomes heated while in contact with the grain, such heated air will rise and ascend through the grain to the top thereof, provided there be air admitted at the bottom of the bin to supply the place of warm air that will, if free, rise up out of the grain.

Upon this principle the grain will ventilate itself whenever it can be supplied with cool air at the bottom of the bin, but merely perforating the bottom of the bin will not answer the purpose, as the grain lies upon and over the perforations, and thus prevents the free admission of the cool air; but by raising the perforated tube D a few feet, more or less, above the bottom of the bin, and have the conical perforated top $c$, with the large opening $d$ through the bottom of the bin, and the tube D fit close to the inclined bottom, the grain will not pack against the tube, so as to close the perforations therein, but will allow the cool air from below to freely pass through such perforations and into the spaces between the kernels of grain, driving out the heated air contained between such kernels by supplying the space with cool air. This process will go on, rising higher in the grain, as the grain itself affords the means of circulation, until the heated air among the grain has arisen and passed above the grain in the bin, and cool air has supplied its place, thus affording the ready means of self-ventilation, by bringing free air into contact with all the grain in the bin.

Having thus described my invention.

What I claim, and desire to secure by Letters Patent, is—

1. The combination of the perforated tube or shield C, air-pipe $c'$, angular bracket or plate $e$, with the grain-bin A B, in the manner and for the purpose substantially as described.

2. The combination of the perforated tube or shield D, having conical perforated top $c$ and opening $d$, with the grain-bin A B, in the manner and for the purpose substantially as described.

FITCH RAYMOND.

Witnesses:
EDM. F. BROWN,
JOHN F. FENNELL.